(12) United States Patent
Lewis

(10) Patent No.: US 8,979,095 B2
(45) Date of Patent: Mar. 17, 2015

(54) WHEELED TRAVOIS

(71) Applicant: Chase Lewis, Chapel Hill, NC (US)

(72) Inventor: Chase Lewis, Chapel Hill, NC (US)

( * ) Notice: Subject to any disclaimer, the term of this patent is extended or adjusted under 35 U.S.C. 154(b) by 0 days.

(21) Appl. No.: 13/958,172

(22) Filed: Aug. 2, 2013

(65) Prior Publication Data

US 2015/0035240 A1 Feb. 5, 2015

(51) Int. Cl.
*B62B 5/06* (2006.01)
*B62B 1/20* (2006.01)

(52) U.S. Cl.
CPC ............... *B62B 5/068* (2013.01); *B62B 1/206* (2013.01)
USPC .......................................... 280/1.5; 280/47.24

(58) Field of Classification Search
USPC ............. 280/1.5, 47.131, 47.17, 47.23, 47.24
IPC .......................................... B62B 5/068,2202/42
See application file for complete search history.

(56) References Cited

U.S. PATENT DOCUMENTS

| | | | | | |
|---|---|---|---|---|---|
| 2,351,292 | A | * | 6/1944 | Rose | 280/47.24 |
| 4,765,642 | A | * | 8/1988 | Struzina | 280/656 |
| 5,362,079 | A | * | 11/1994 | Graham | 280/47.23 |
| 5,624,128 | A | * | 4/1997 | Owens | 280/250.1 |
| 6,161,850 | A | * | 12/2000 | James et al. | 280/47.18 |
| 6,685,198 | B1 | * | 2/2004 | Hartman | 280/1.5 |
| 2004/0183263 | A1 | * | 9/2004 | Joncourt | 280/1.5 |
| 2008/0174078 | A1 | * | 7/2008 | Dooley | 280/1.5 |

OTHER PUBLICATIONS

Goodier, Rob, "A 12-year-old engineer designs a life-saving travois for refugees," Engineering for Change, Mar. 20, 2012. https://www.engineeringforchange.org/news/2012/03/20/a_12_year_old_engineer_designs_a_life_saving_travois_for_refugees.html.
Platt, Wes, "Helpful Hauling," The Herald-Sun, Aug. 2, 2012, The Durham Herald Co., Durham, N.C.
Lewis, Chase, "Chase—The Devil is in the Details," Aug. 30, 2012. http://blog.youngscientistchallenge.com/2012/08/chase-the-devil-is-in-the-details/.

* cited by examiner

*Primary Examiner* — Kevin Hurley
(74) *Attorney, Agent, or Firm* — Nelson Mullins Riley & Scarborough LLP

(57) ABSTRACT

A collapsible, wheeled travois that may be used to transport multiple passengers in a hands-free mode is provided. The wheeled travois is quickly and easily assembled and includes detachable wheels, support members, load carrying surface, and harness.

15 Claims, 12 Drawing Sheets

WHEELED TRAVOIS

FIELD OF THE INVENTION

The present invention relates generally to transportation devices. More particularly, the present invention relates to a wheeled travois that may carry loads, including humans, and that may be mobilized by a human driver without using one's hands.

BACKGROUND OF THE INVENTION

People, particularly children, with limited physical capabilities or stature often require assistance of some manner when being transported from one place to another. In particular, mothers or fathers often will carry younger children from place to place in their arms. However, when carrying others in one's arms, great care and attention is needed to ensure safe transport of the transported individual, particularly if a child is being carried. In addition, when transporting someone in one's arms, the transporter's arms are then occupied and additional load carrying or cart pushing/pulling is generally impossible. Sometimes, packs or other carriers are employed to transport children on the shoulders, backs, or chests of parents, but oftentimes, such packs are unwieldy, heavy, and burdensome. The use of such packs and carriers may also lead to injuries for both the carrier and the person being carried.

Various pulled and/or pushed transportation devices have also been utilized to transport persons or loads from one place to another. Typically, wheeled devices such as wheelbarrows and carts, as well as non-wheeled devices, such as a travois, have been utilized for transporting both humans and other loads. Such devices, however, often place unsatisfactory strain on the person pulling or pushing the transportation device and are not easily transportable or storable when not in use.

In times of famine and drought, such as what occurred during the Somali famine of 2011, many families in east Africa fled their homes to begin long treks, often lasting weeks, to travel to refugee centers and camps in order to obtain food, water, and shelter. Oftentimes, a parent would have to carry their children for miles. In some cases, it was impossible for a parent to carry more than one or two children in their arms, on their backs/chests, and/or in a pushed/pulled cart or wheelbarrow. Therefore, parents were left with an impossible choice to decide which children to leave by the roadside to die of starvation or dehydration and which children to take to safety and shelter. If these families would have had access to simple transportation devices allowing them to carry more than one or two children at a time, more children would have reached the refugee centers and would have survived.

The present invention recognizes and addresses considerations of prior art constructions and methods.

SUMMARY OF THE INVENTION

One embodiment of a collapsible, wheeled travois that may be used for transporting loads from place to place in accordance with the present disclosure includes a pulling end and a rolling end; a support frame having three connected frame support members, wherein each of the frame support members has opposing first and second ends, wherein two of the frame support members are elongated and have approximately the same length, wherein one of the frame support members is shorter than the two elongated frame support members, wherein the two elongated frame support members are attached at a vertex formed by crossing and attaching the elongated frame support members to each other at a point closer to their first ends than to their second ends to form at least a two-sided angular-shaped frame portion at the pulling end of the travois pulling the travois, and wherein the first and second opposing ends of the shorter frame support member are attached to the second ends of the two elongated frame support members at the support frame rolling end by detachable and preformed wheel attachment joints to form a three-sided closed triangular frame portion between the wheel attachment joints and the vertex; a lightweight, load carrying surface formed within the three-sided closed triangular frame portion upon which loads may be transported thereon from place to place; quick connect detachable wheels located at the rolling end of the travois and mounted on the wheel attachment joints; and an attachment mechanism mounted at the pulling end of the travois to allow a person to be attached to the two-sided angular-shaped frame portion to allow for hands-free pulling of the travois during movement of loads from place to place, and further wherein the frame support members, wheels, and wheel attachment joints are detachable so that the wheeled travois may be collapsed into a suitable size for ease of packing and stowing and are re-engageable for quick assembly of the wheeled travois.

In another embodiment of the present invention and as disclosed herein, the present invention includes a collapsible, wheeled travois comprising a pulling end and a rolling end; a support frame having three connected frame support members, wherein each of the frame support members comprises a wood and has opposing first and second ends, wherein two of the frame support members are elongated and have approximately the same length, wherein one of the frame support members is shorter than the two elongated frame support members, wherein the two elongated frame support members are attached by a seated joint at a vertex formed by crossing and attaching the elongated frame support members to each other at a point closer to their first ends than to their second ends to form at least a two-sided angular-shaped frame portion at the pulling end of the travois, and wherein the first and second opposing ends of the shorter frame support member are attached to the second ends of the two elongated frame support members at the support frame rolling end by detachable and preformed wheel attachment joints to form a three-sided closed triangular frame portion between the wheel attachment joints and the vertex; a lightweight, load carrying surface comprising a net structure and a cloth material and formed within the three-sided closed triangular frame portion upon which loads may be transported thereon from place to place; quick connect detachable wheels located at the rolling end of the travois and mounted on the wheel attachment joints; and an attachment mechanism mounted at the pulling end of the travois to allow a person to be attached to the two-sided angular-shaped frame portion to allow for hands-free pulling of the travois during movement of loads from place to place, and further wherein the frame support members, wheels, and wheel attachment joints are detachable so that the wheeled travois may be collapsed into a suitable size for ease of packing and stowing and are re-engageable for quick assembly of the wheeled travois.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
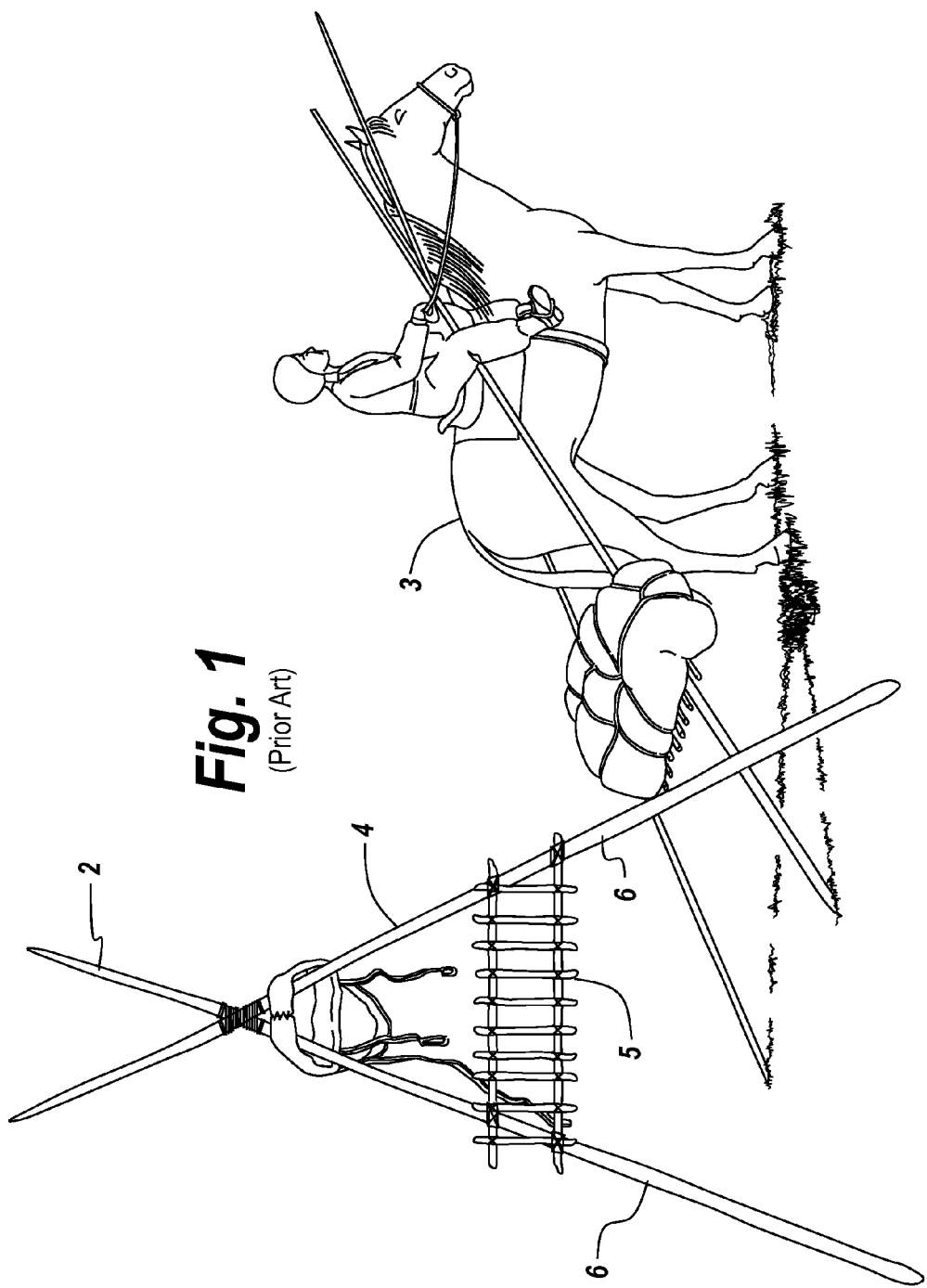
FIG. 1 is a drawing of a prior art travois.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
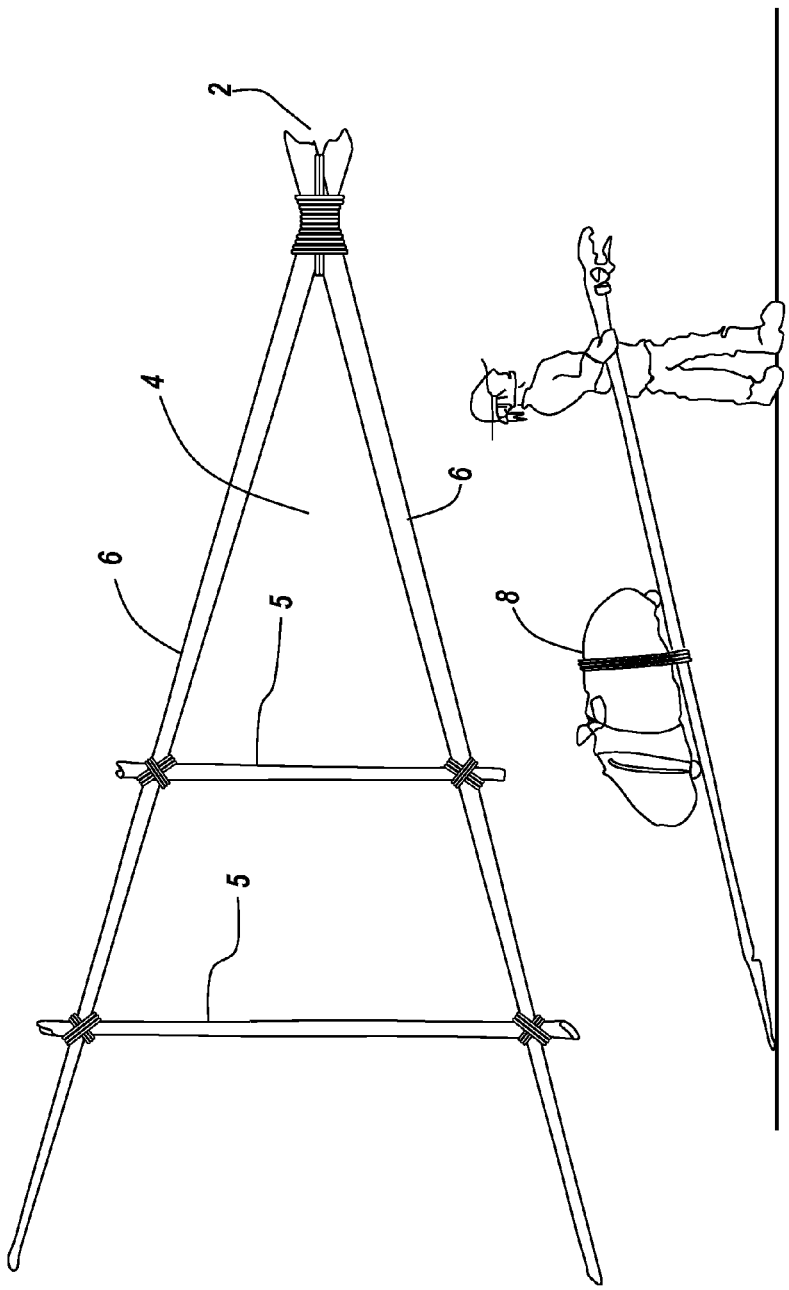
FIG. 2 is a drawing of another prior art travois.

A simple travois is typically made from two outside frame members, such as sticks, that are attached together at a common vertex to form two sides of opposite triangles as shown in the prior art figures of FIG. 1 and FIG. 2. One triangle 2 (the smaller one) is where the driver or transporter will be attached to pull the travois (typically with a horse 3 as often employed by Native Americans as depicted in FIG. 1 or by a person as shown 7 as shown in FIG. 2) and the other triangle 4 (the larger one) typically has inside load supporting members 5 attached between the outside frame members 6 to form a seat or carrying surface for transporting persons and/or other loads 8.

Referring now to the Figures, an embodiment of a collapsible, wheeled travois 10 in accordance with the present disclosure includes a support frame formed and assembled from three frame support members 20. The frame support members 20 may be made from various materials, but typically, a lightweight, strong wood may be utilized for the frame support members. Other materials, such as bamboo, metals such as aluminum, wood that has been reinforced with various metals including aluminum, and various other relatively lightweight materials may also be utilized.

Figure 3A:
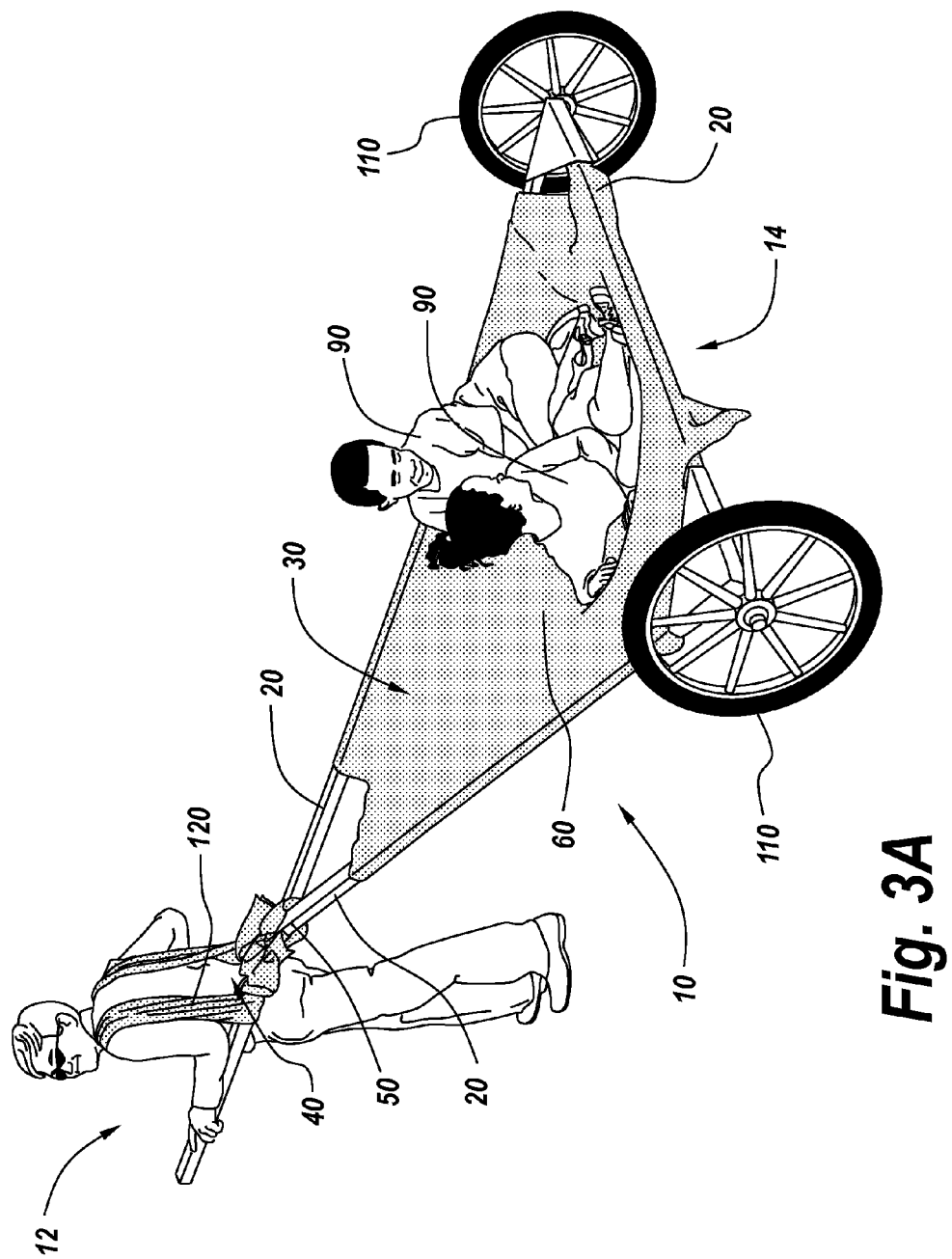
FIG. 3A is a perspective view of a wheeled travois in accordance with the present invention shown with driver and transported children.
Figure 3B:
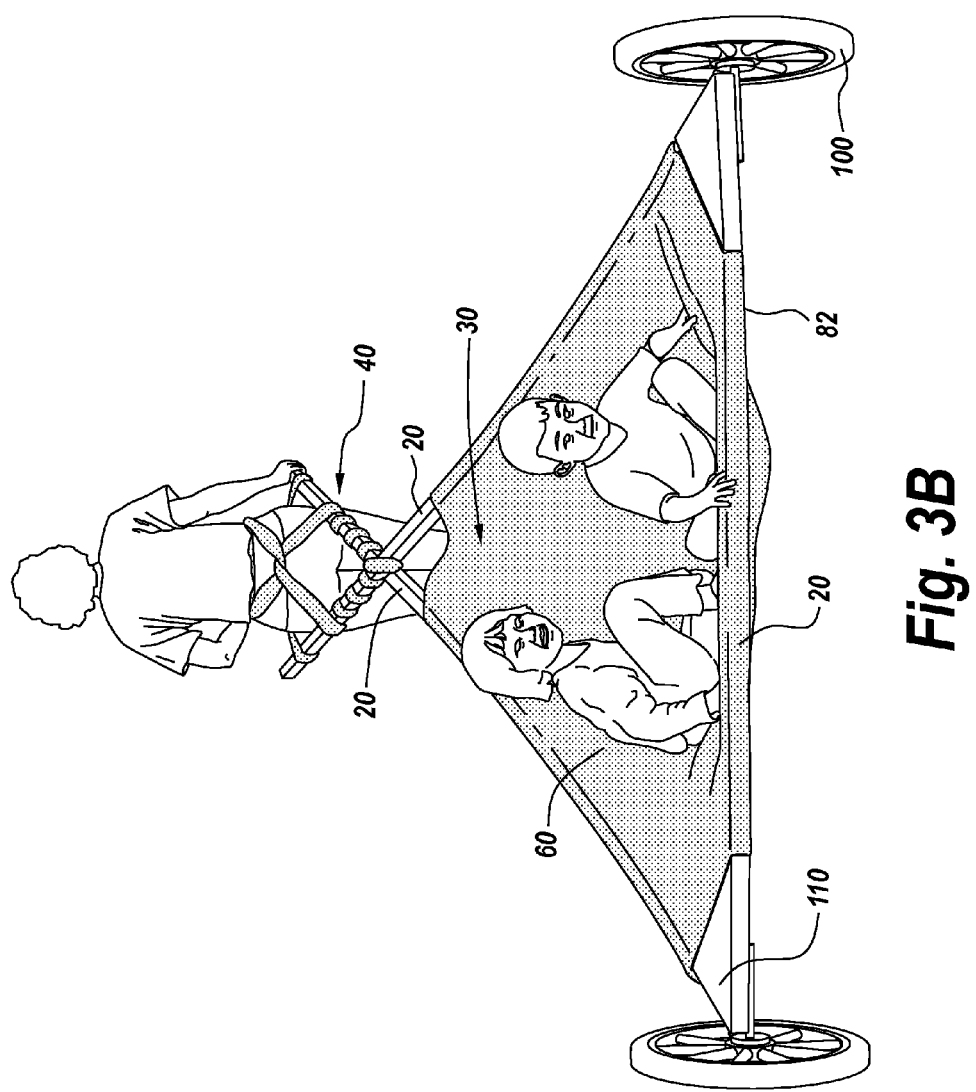
FIG. 3B is a rear view of a wheeled travois in accordance with the present invention shown with driver and transported children.
Figure 4:
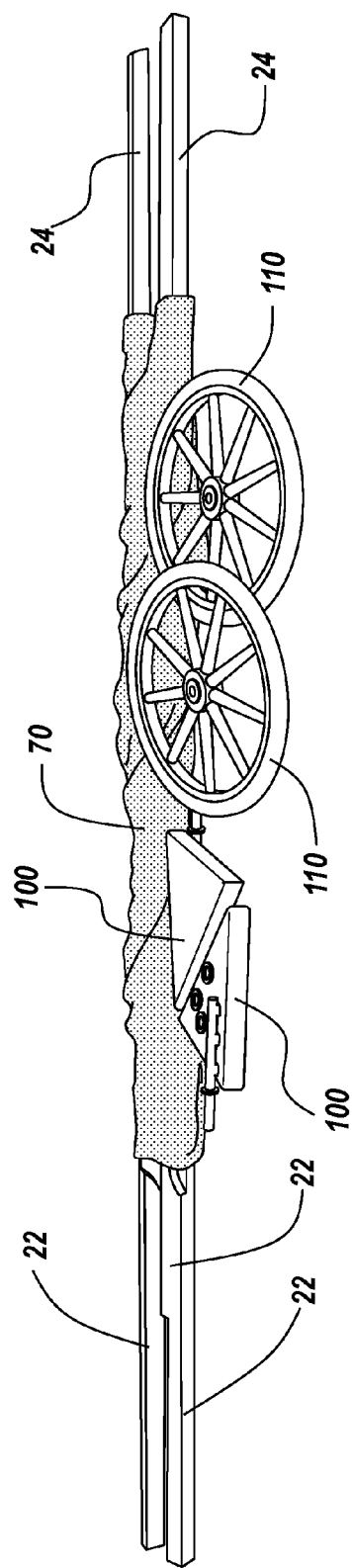
FIG. 4 is a perspective view of the majority of the unassembled components of the collapsible, wheeled travois shown in FIG. 3.
Figure 8:
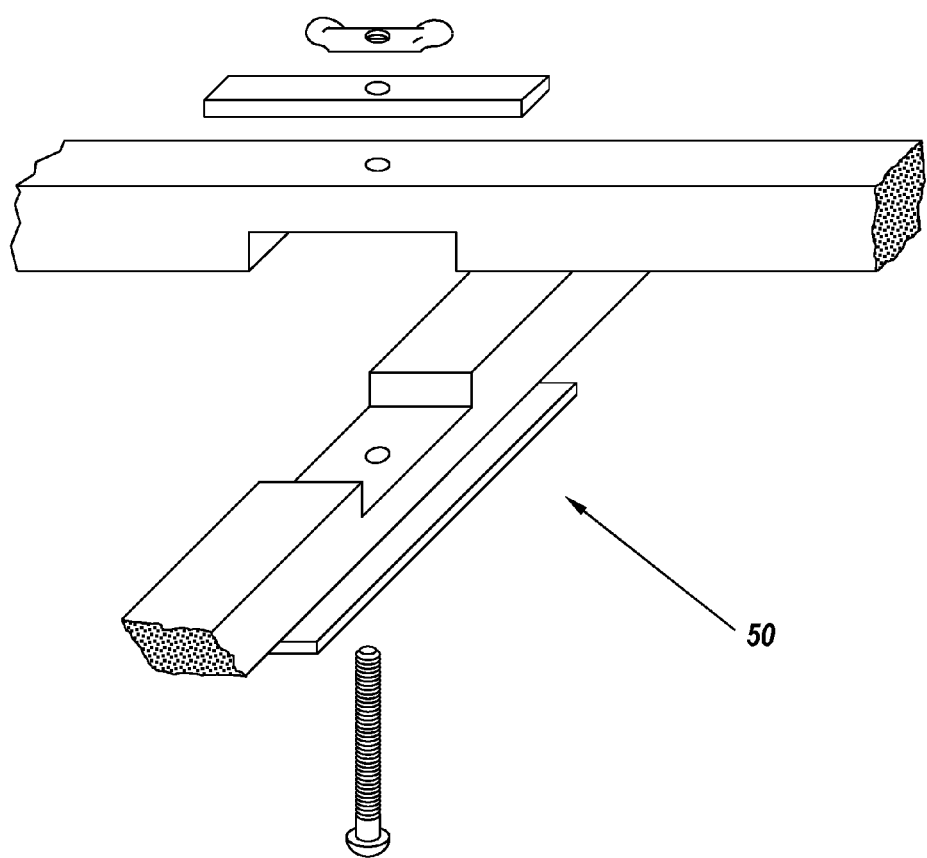
FIG. 8 is a drawing of an exemplary seated joint for forming the vertex of the travois of FIG. 1.
Figure 9A:
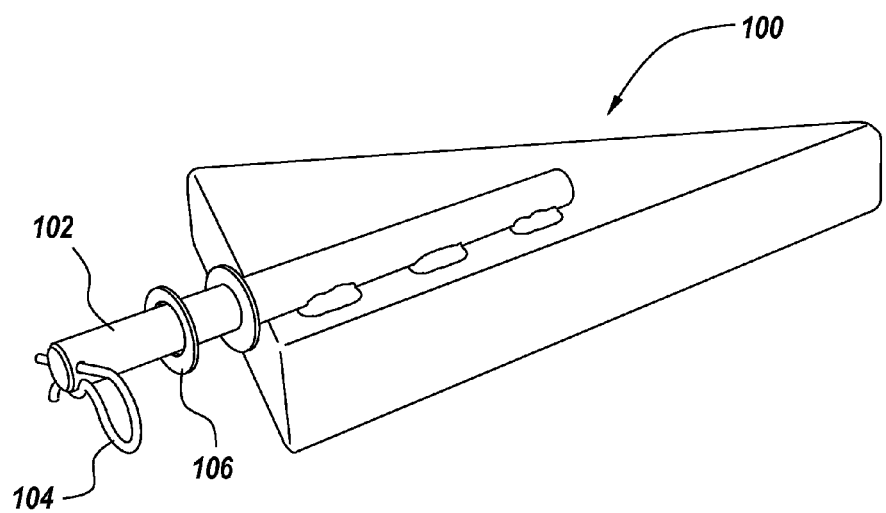
FIGS. 9A and 9B are views of the detachable and preformed wheel attachment joints employed in the wheeled travois of the present invention.
Figure 9B:
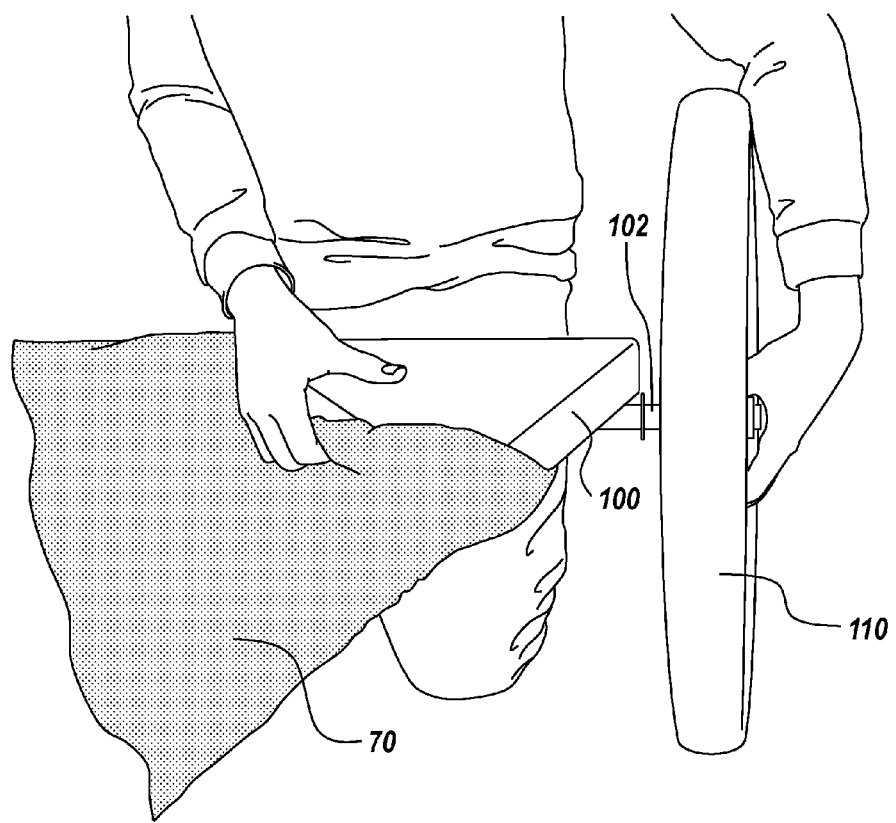

As shown in FIG. 4, each of the three frame support members 20 has a first end 22 and a second end 24 (only the first end of the shorter frame support member can be seen in FIG. 4). As shown in FIGS. 3 and 4, two of the frame support members 20 are elongated and may be of generally equal length and the third frame support member 20 is shorter. When the wheeled travois 10 is assembled, the shorter frame support member 20 forms the base of a three-sided closed triangular frame portion 30 as well as a wheel axle at the rolling end 14 of the wheeled travois 10. The elongated frame support members 20 are joined by a seated joint, such as a dado joint shown in FIG. 8, to form a vertex 50 (FIGS. 3 and 6) which forms an opposing smaller, at least two-sided, typically open-ended, angular-shaped frame portion 40 at the pulling end 12 of the wheeled travois 10. As will be explained below, the typically open-ended, angular-shaped frame portion 40 is where the driver/puller will be attached to the travois at the pulling end 12. In certain embodiments, a fourth support member could be utilized to close the end of the at least two-sided smaller triangle.

A seated joint 60 is generally employed in the present invention to allow for strength of attachment, automatic alignment when the frame support members 20 are being connected to form the vertex, and ease of assembly and disassembly. One such seated joint 60 is exemplarily shown in FIG. 8. Such an arrangement is also known as a "Lincoln Log joint".

The second ends 24 of the elongated frame support members 20 are attached to both the first and second ends 24 that oppose each other on the shorter frame support member 20. In an embodiment, the shorter frame support member is attached at the rolling end 14 of the travois by use of two detachable and preformed wheel attachment joints 100. The wheel attachment joints have a quick connect mechanism, for example, a metal rod 102 with a cotter pin 104 and washer 106, upon which a detachable wheel 110 may be attached and detached quickly. Moreover, the wheel attachment joint 100 may have predrilled holes for inserts of bolts, pins, or other connecting devices that allow the wheel attachment joint 100 to be removably attached to the second ends 24 of the elongated frame support members and both the first end 22 and second end 24 of the shorter frame support member.

A lightweight, but relatively strong, load carrying surface 60 is carried within the three-sided closed triangular frame portion 30 upon which passengers 90 or loads may ride. In some embodiments, the load carrying surface may be formed from a cloth material 70 that may be mounted on an underlying cargo net 80 or other supporting mechanism. However, various materials may be employed in making the load carrying surface, which may or may not have an underlying supporting mechanism.

Figure 7:
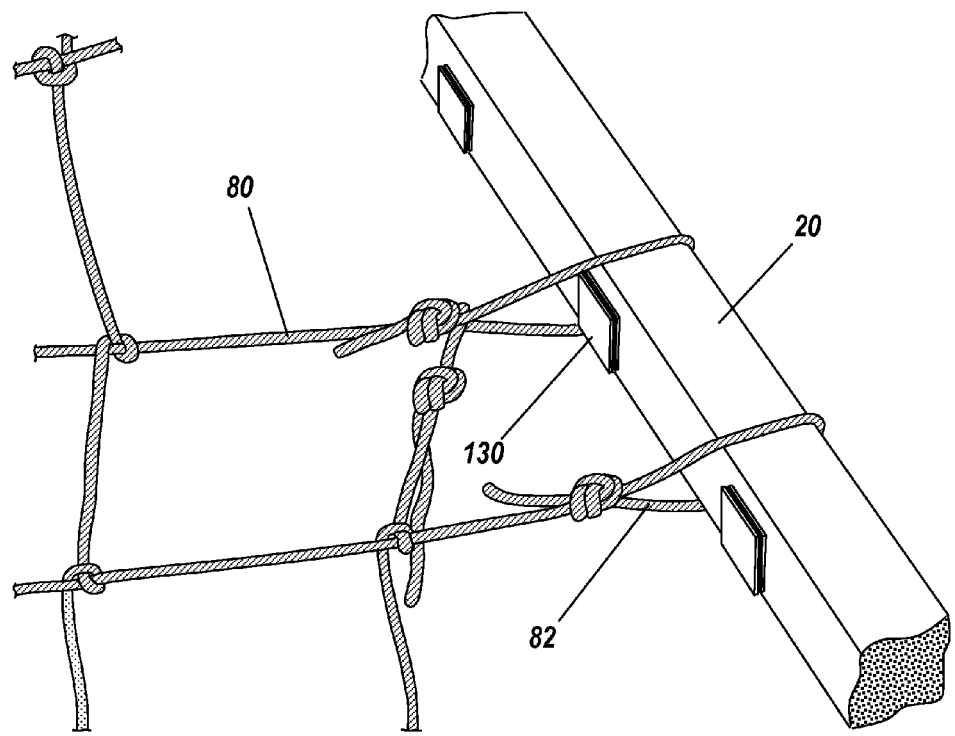
FIG. 7 is a top view of the cargo net attached to a frame support member.
Figure 10:
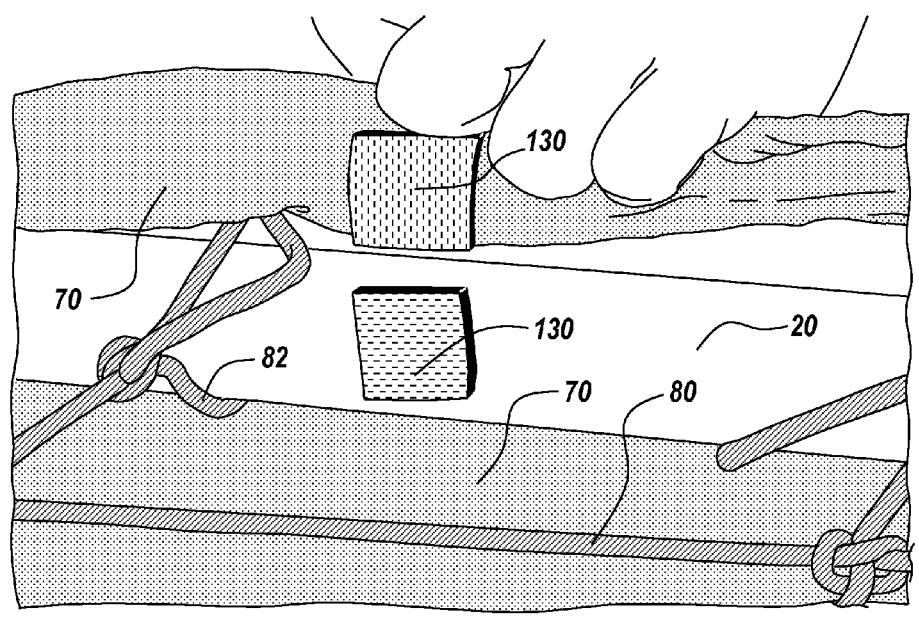
FIG. 10 shows an exemplary attachment mechanism for attaching the cloth material to the frame support members of the present invention.

The load carrying surface 60 may be attached to the three-sided closed triangular frame portion 30 of the travois 10 by various means. One such exemplary means for attaching the load carrying surface, in the exemplary embodiment a cloth material 70, is shown in FIGS. 7 and 10 and comprises a hook and loop attachment arrangement 130. Use of removably attachable attaching mechanisms, such as the hook and loop attachment arrangement 130, allows for quick assembly and disassembly of the collapsible, wheeled travois.

Figure 6:
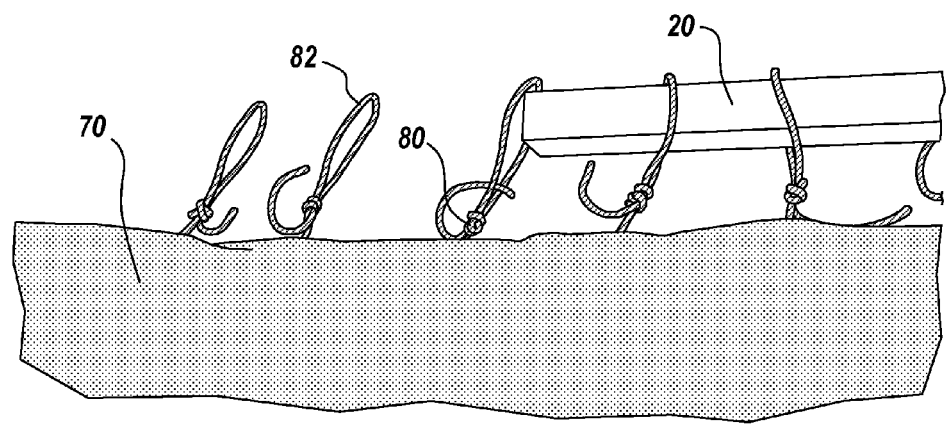
FIG. 6 shows the attachment of a pre-tied cargo net being slipped onto a frame support member with a load-carrying cloth surface.

If a cargo net 80 is employed as the underlying support member of the load carrying surface, such a net may be pre-tied in multiple loop knots 82 at its periphery boundary as shown in FIGS. 6, 7 and 10. During assembly and attachment of the load carrying surface 60 components, an end of the frame support members 20 may be inserted through the loop knots 82. Such an arrangement allows for quick assembly and disassembly of the wheeled travois.

Figure 5:
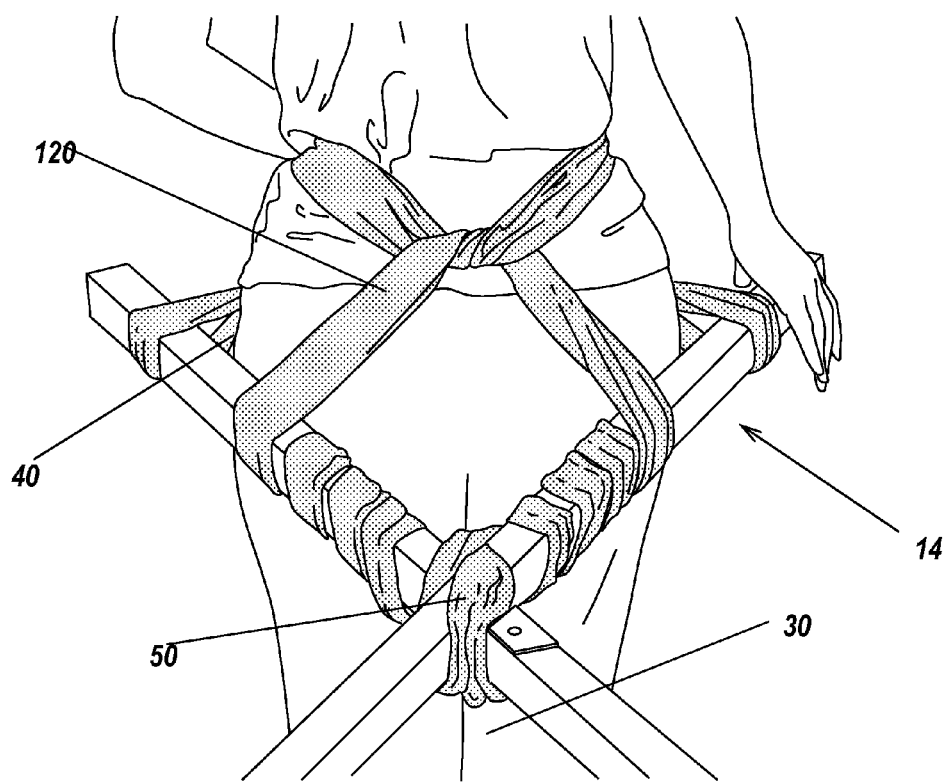
FIG. 5 is a perspective view of the vertex and smaller triangle of the travois of FIG. 3 showing a puller attached to the travois with a harness.

A harness 120 is attached to the pulling end 12 of the wheeled travois 10. Specifically, a harness 120 is provided for attachment to a driver/puller who will take a position within the two-sided, typically open-ended, angular-shaped frame portion 40. Various harness arrangements may be utilized, but two such exemplary harnesses 120 are shown in FIGS. 3A, 3B and 5. In FIG. 3A, the attachment harness 120 is made from a cloth material and is a shoulder harness for attachment over the shoulders of the driver/puller. In FIGS. 3B and 5, the attachment harness 120 is made from a cloth material and is a waist harness for tied attachment around the waist of the driver/puller.

Figure 11:
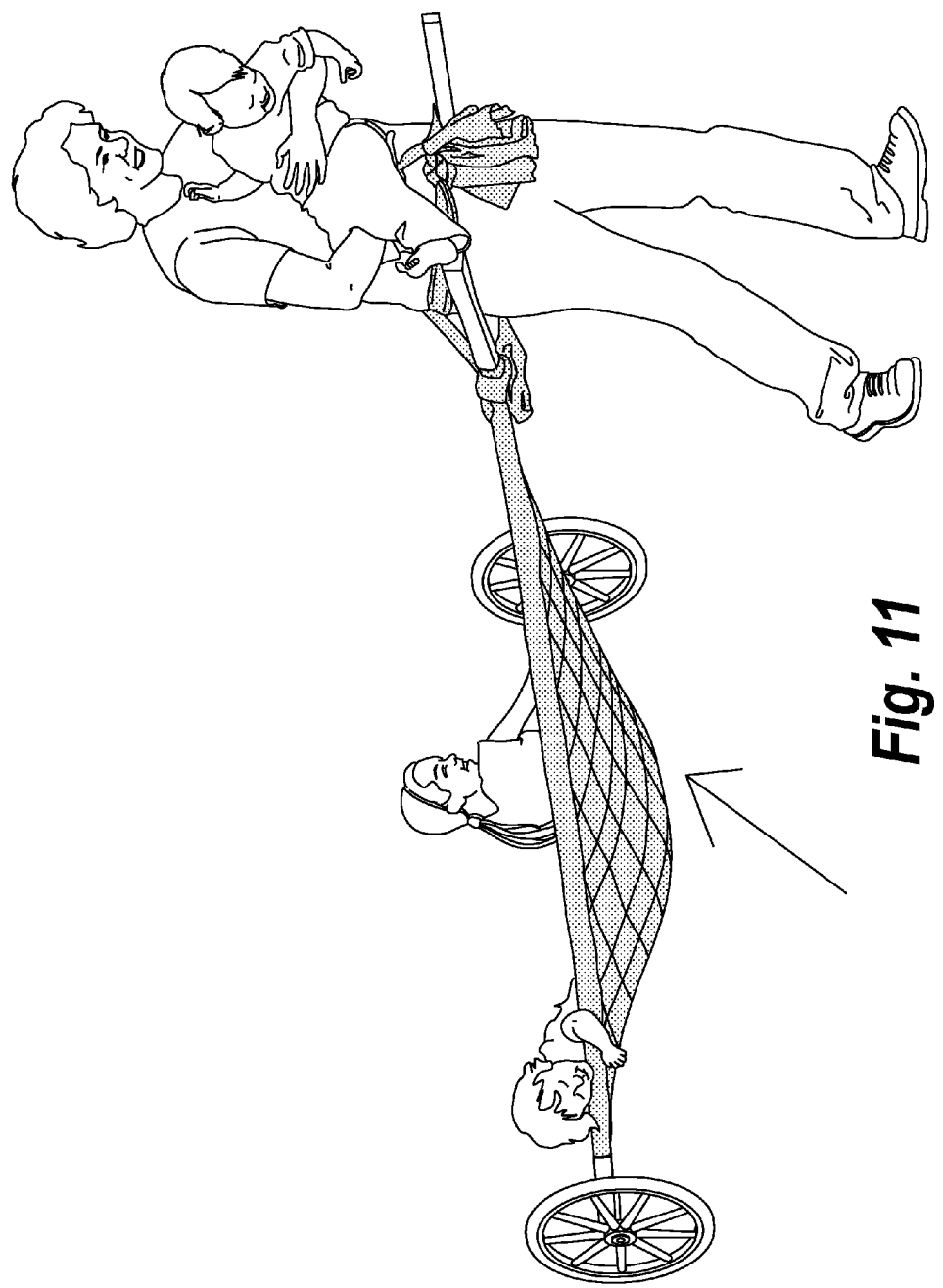
FIG. 11 shows a wheeled travois being pulled hands-free by a driver also carrying an infant.

As shown in FIG. 11, the use of harnesses 120 that are hands-free in the present invention allow the driver/puller to not only pull/drive the wheeled travois, but to also carry an infant for safe transport. Depending on the weight limit and size of the passengers on the load carrying surface 60 of the wheeled travois, multiple numbers of riders such as children may be transported by the wheeled travois while the driver/puller also carries one or more children in their arms or on their backs and/or chests.

Features of the wheeled travois of the present inventions may include:

1) Sufficiently sized so as to carry two or more children/passengers. This is significant in areas such as Africa where the average family has four children. Oftentimes, an African driver/puller will also be carrying a baby on her/his back or chest.

2) Hands-free operation. The travois needs to be operable in hands-free mode. Again, drivers/pullers often need to use their hands to carry additional children.

3) Transfer some of the load from the driver/puller.

4) Strong enough to stand up on long treks without breaking.

5) Collapsibility. The travois of the present invention is collapsible so it can be flat-shipped and air-dropped with ease and/or easily stored.

6) Easily assembled. In countries where the collapsible, wheeled travois, many do not understand technical assembly procedures. Therefore, in some embodiments, the travois should be quickly and easily assembled.

7) Inexpensive. The travois should be inexpensive in order to be affordable by needy families who will use it as essentially a life-saving tool.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

What is claimed is:

1. A collapsible, wheeled travois comprising:
   a pulling end and a rolling end;
   a support frame having three connected frame support members, wherein each of the frame support members has opposing first and second ends, wherein two of the frame support members are elongated and have approximately the same length, wherein one of the frame support members is shorter than the two elongated frame support members, wherein the two elongated frame support members are attached at a vertex formed by crossing and attaching the elongated frame support members to each other at a point closer to their first ends than to their second ends to form at least a two-sided angular-shaped frame portion at the pulling end of the travois, and wherein the first and second opposing ends of the shorter frame support member are attached to the second ends of the two elongated frame support members at the support frame rolling end by detachable and preformed wheel attachment joints to form a three-sided closed triangular frame portion between the wheel attachment joints and the vertex;
   a lightweight, load carrying surface formed within the three-sided closed triangular frame portion upon which loads may be transported thereon from place to place;
   quick connect detachable wheels located at the rolling end of the travois and mounted on the wheel attachment joints; and
   an attachment mechanism mounted at the pulling end of the travois to allow a person to be attached to the two-sided angular-shaped frame portion to allow for hands-free pulling of the travois during movement of loads from place to place, and further
   wherein the frame support members, wheels, and wheel attachment joints are detachable so that the wheeled travois may be collapsed into a suitable size for ease of packing and stowing and are re-engageable for quick assembly of the wheeled travois.

2. The collapsible, wheeled travois of claim 1 wherein the travois can transport loads of 50 pounds or greater.

3. The collapsible, wheeled travois of claim 1 wherein the load carrying surface comprises a net structure and a cloth material.

4. The collapsible, wheeled travois of claim 1 wherein the frame support members are formed from wood.

5. The collapsible, wheeled travois of claim 1 wherein the frame support members are formed from metal.

6. The collapsible, wheeled travois of claim 4 wherein the frame support members are reinforced with metal.

7. The collapsible, wheeled travois of claim 5 wherein the metal is aluminum.

8. The collapsible, wheeled travois of claim 6 wherein the metal is aluminum.

9. The collapsible, wheeled travois of claim 1 wherein the wheels are non-pneumatic.

10. The collapsible, wheeled travois of claim 1 wherein the attachment mechanism is a waist harness.

11. The collapsible, wheeled travois of claim wherein the attachment mechanism is a shoulder harness.

12. The collapsible, wheeled travois of claim 1 wherein the attachment mechanism is formed from a cloth material.

13. The collapsible, wheeled travois of claim 1 wherein the two elongated frame support members are attached via a seated joint.

14. The collapsible, wheeled travois of claim 13 wherein the seated joint is a dado joint.

15. A collapsible, wheeled travois comprising:
    a pulling end and a rolling end;
    a support frame having three connected frame support members, wherein each of the frame support members comprises a wood and has opposing first and second ends, wherein two of the frame support members are elongated and have approximately the same length, wherein one of the frame support members is shorter than the two elongated frame support members, wherein the two elongated frame support members are attached by a seated joint at a vertex formed by crossing and attaching the elongated frame support members to each other at a point closer to their first ends than to their second ends to form at least a two-sided angular-shaped frame portion at the pulling end of the travois, and wherein the first and second opposing ends of the shorter frame support member are attached to the second ends of the two elongated frame support members at the support frame rolling end by detachable and preformed wheel attachment joints to form a three-sided closed triangular frame portion between the wheel attachment joints and the vertex;

a lightweight, load carrying surface comprising a net structure and a cloth material and formed within the three-sided closed triangular frame portion upon which loads may be transported thereon from place to place;

quick connect detachable wheels located at the rolling end of the travois and mounted on the wheel attachment joints; and an attachment mechanism mounted at the pulling end of the travois to allow a person to be attached to the two-sided angular-shaped frame portion to allow for hands-free pulling of the travois during movement of loads from place to place, and further wherein the frame support members, wheels, and wheel attachment joints are detachable so that the wheeled travois may be collapsed into a suitable size for ease of packing and stowing and are re-engageable for quick assembly of the wheeled travois.

\* \* \* \* \*